United States Patent [19]

Waack et al.

[11] 4,059,025
[45] Nov. 22, 1977

[54] SPEED CONTROL

[75] Inventors: Carl L. Waack; Alador J. Giss, both of Livonia, Mich.

[73] Assignee: Massey-Ferguson Inc., Detroit, Mich.

[21] Appl. No.: 698,239

[22] Filed: June 21, 1976

[51] Int. Cl.² ................. G05G 1/14; G05G 11/00
[52] U.S. Cl. .................................... 74/482; 74/470; 74/513
[58] Field of Search ............... 74/470, 481, 482, 513

[56] References Cited
U.S. PATENT DOCUMENTS

| 2,821,091 | 1/1958 | Benner | 74/482 |
| 3,002,397 | 10/1961 | Du Shane et al. | 74/482 |
| 3,040,596 | 6/1962 | Du Shane et al. | 74/482 |
| 3,198,301 | 8/1965 | Randall | 74/470 X |
| 3,535,951 | 10/1970 | Larson et al. | 74/482 |
| 3,869,937 | 3/1975 | Ahrens | 74/482 |

Primary Examiner—Allan D. Herrmann
Attorney, Agent, or Firm—John C. Thompson

[57] ABSTRACT

A vehicle having an engine speed regulator, an operator's platform, a bulkhead forward of the platform, and a speed regulator including a positionable hand lever and spaced apart foot pedals operable to override the speed determined by the hand lever without affecting movement of the hand lever. The hand lever, the spaced apart foot pedals and the linkage structure interconnecting the various controls are disposed entirely above the platform and behind the bulkhead.

9 Claims, 5 Drawing Figures

SPEED CONTROL

This application discloses an improvement over the invention shown in U.S. Pat. application Ser. No. 570,324 filed Apr. 21, 1975, entitled "Speed Control", now abandoned.

The present invention relates generally to a speed control mechanism for a vehicle having an operator's station including a platform and forward bulkhead and more particularly to a speed control system including a hand lever positionable to initially set the engine speed and a pair of foot pedals adapted to override the hand level to either accelerate or decelerate the vehicle without changing the position of the hand lever, the foot pedals, hand lever and associated linkage being entirely disposed above the operator's platform and behind the forward bulkhead.

In vehicles such as farm tractors and the like it is common to provide an operator's station which includes a forward wall portion or bulkhead and a lower wall portion or operator's platform. The operator's station is frequently enclosed by a cab so that the operator's environment can be controlled to thereby reduce noise, dust, etc. It is conventional to provide farm tractors with a hand lever positionable in various settings to control the engine speed. It is also known in the prior art to provide a pair of foot pedals which may be alternately engaged to either temporarily increase or decrease the engine speed without affecting the setting of the hand lever, the engine speed returning to that speed for which the hand lever is set when the operator is no longer engaging the foot pedals.

The prior art speed controls of the type referred to above have not generally been applied to an operator's station including a platform and forward bulkhead, but when so applied the linkage interconnecting the hand lever and the foot pedals have extended either through apertures in the forward bulkhead or through the platform, or both. Whenever either the bulkhead or the platform is apertured it is necessary to provide sealing means to seal off the aperture if the entrance of noise, dust, etc. is to be minimized, and such sealing means adds additional costs to the vehicle and are frequently of poor durability.

In the prior art constructions referred to above frequently the various components which form part of the linkage interconnecting the hand lever and the foot pedals are in turn affixed to other portions of the vehicle. This may make servicing of the vehicle more difficult if it is necessary to remove the platform and/or bulkhead. Thus, these controls must be disconnected from other portions of the vehicle before the bulkhead and/or platform can be removed for servicing.

In accordance with the principles of the present invention the disadvantages of the foregoing prior art constructions are overcome by mounting a speed control mechanism above the platform and behind the forward bulkhead, the speed control mechanism, including a hand lever positionable in a plurality of locations to regulate the engine speed, a pair of foot pedals, and interconnecting linkage. One of the foot pedals may be used to temporarily accelerate the engine speed without affecting the position of the hand lever, and the other may be utilized to temporarily decelerate the engine speed without affecting the position of the hand lever. The bulkhead is apertured for the reception of a push-pull cable which controls the engine speed. The speed control of this invention minimizes the entry of noise, dust, etc. to the operator's station, and facilitates servicing of the vehicle when it is necessary to remove the operator's platform and forward bulkhead.

The foregoing advantages and other advantages will be apparent to those skilled in the art after a consideration of the following detailed description taken in conjunction with accompanying drawings in which a preferred form of this invention is illustrated.

FIG. 5 is a sectional view of the spring assembly shown in FIG. 2 and 3.

Figure 1:
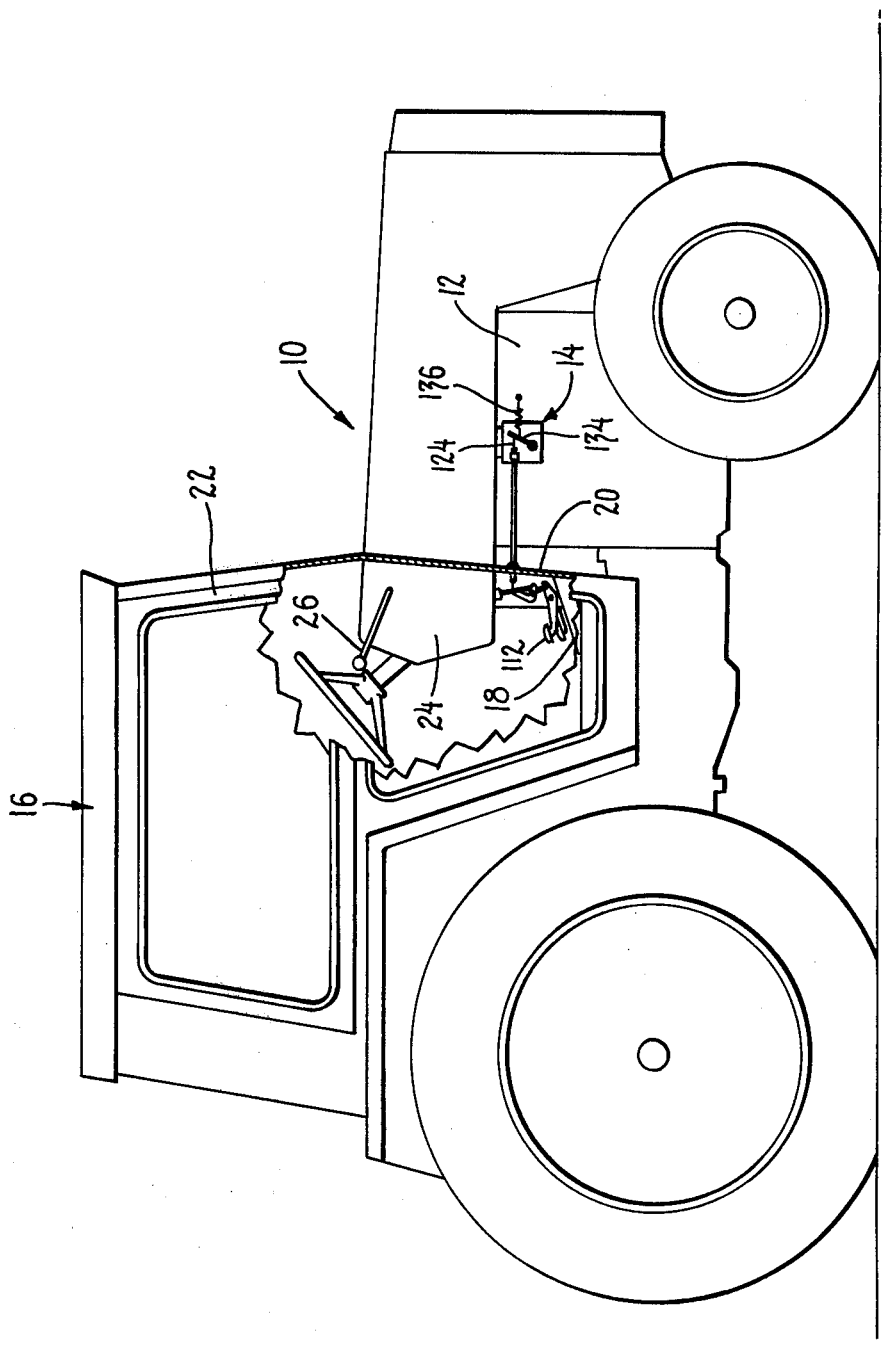
FIG. 1 is a side view of a vehicle in which the principles of the present invention are incorporated.

Referring now to FIG. 1, a vehicle in the form of a farm tractor is indicated generally at 10, the vehicle including an engine 12, engine speed regulator indicated generally at 14, and an operator's station indicated generally at 16, the operator's station including a platform 18 and a forward bulkhead 20. The platform 18 and forward bulkhead 20 may form part of a cab or enclosure 22. Mounted above the platform 18 and behind the forward bulkhead 20 is a console 24, which console may include among various other components hand positional means in the form of a hand lever 26 for setting the engine speed. The hand lever 26 forms part of position responsive acceleration and deceleration control means which is shown in greater detail in the other figures.

Figure 2:
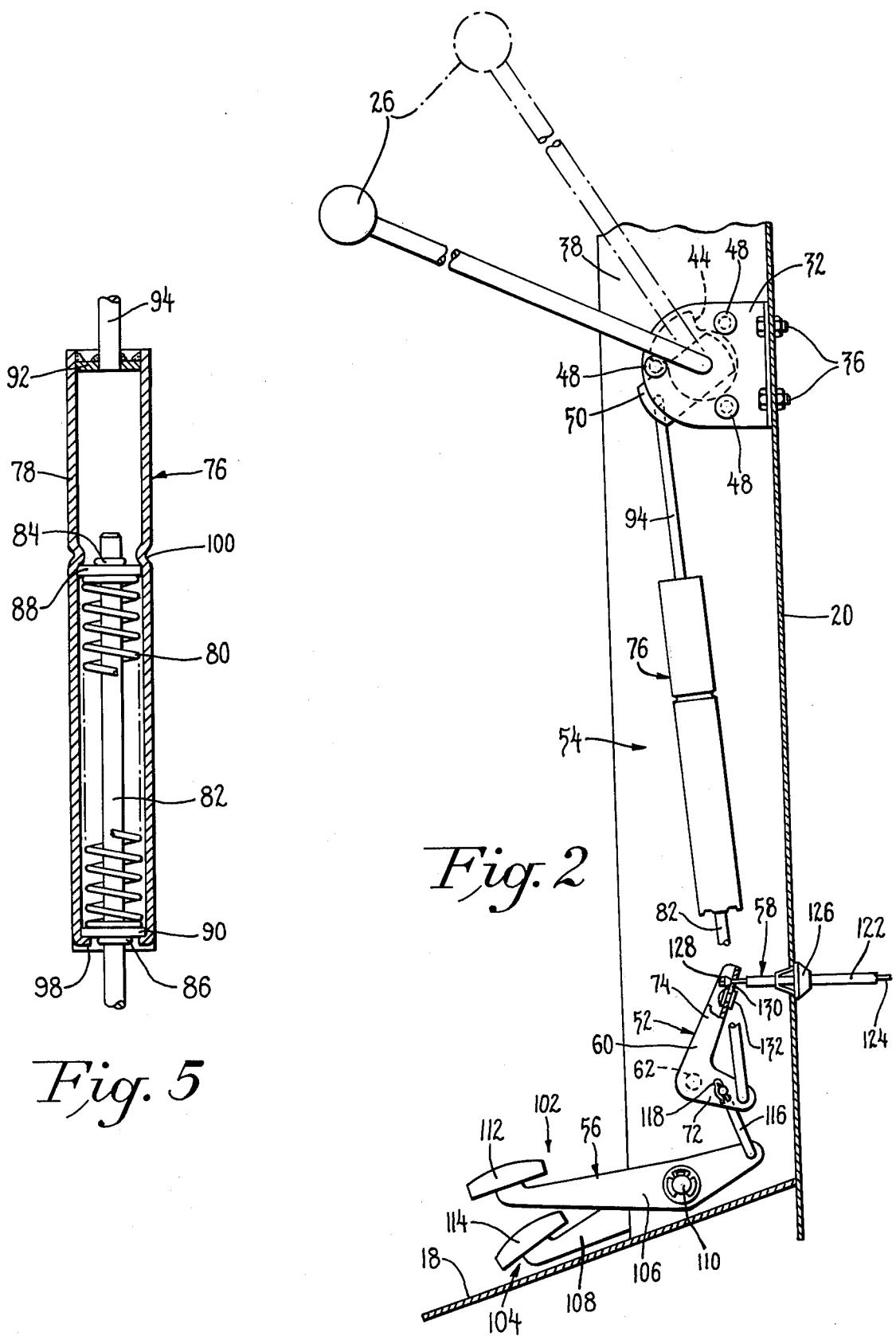
FIG. 2 is a side elevational view of the control device of this invention showing in part the manner upon which it is mounted on a forward bulkhead and platform of the vehicle shown in FIG. 1.
Figure 3:
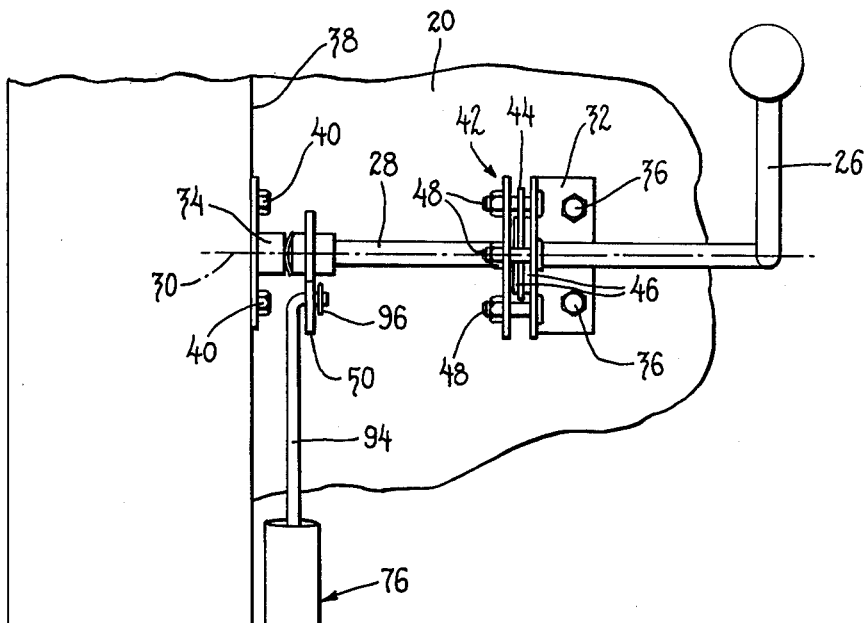
FIG. 3 is a rear elevational view of the structure shown in FIG. 2.

Referring now to FIGS. 2 and 3 the hand positionable means includes in addition to the hand lever 26 a transversely extending shaft 28 mounted for rotational movement about its axis indicated by the broken line 30. The shaft is supported for rotational movement by spaced apart bearing support structures indicated at 32 and 34, the bearing support structure 32 being secured to the forward bulkhead by fasteners 36, and the bearing support 34 being secured to a portion 38 of the console by fasteners 40. The hand lever 26 may be integral with the shaft 28 in which case it is bent at right angles to the shaft. Alternatively, the shaft 26 may be separate and simply be fixed by welding or the like to one end of the shaft 28. Maintaining means indicated generally at 42 are provided for maintaining the hand lever and shaft 28 in a given position. In this regard, it should be noted that the hand lever can be swung between first and second positions indicated in full and broken lines, respectively, in FIG. 2, the first position being a slow idle position, and a second position being the maximum working engine speed position. The maintaining means can maintain the hand lever in any position between the first and second positions. The maintaining means is of a well-known friction clutch assembly design including a center plate or disc 44 secured to the shaft 28, and spaced apart coupling plates or discs 46 provided with friction surfaces engageable with the center disc 44, the coupling plates or discs being held against the center disc by adjustable fasteners 48 one end of which are supported by a portion of the bearing assembly 32. The hand positionable means also include a rock arm 50 one end of which is fixed to the shaft 28.

In addition to the hand positionable means described above, the control means of this invention includes motion transmitting means indicated generally at 52, linkage means indicated generally at 54, the linkage means extending between the rock arm 50 of the hand positionable means and the motion transmitting means 52 and being operable to move the motion transmitting means in response to movement of the hand positionable means, foot control means indicating generally at 56, the foot control means being interconnected with the motion transmitting means and moveable against spring bias for effecting movement of the motion transmitting means without affecting movement of the hand positionable means, and moveable means indicated generally at 58, the moveable means interconnecting the motion transmitting means and the engine speed regulator.

Figure 4:
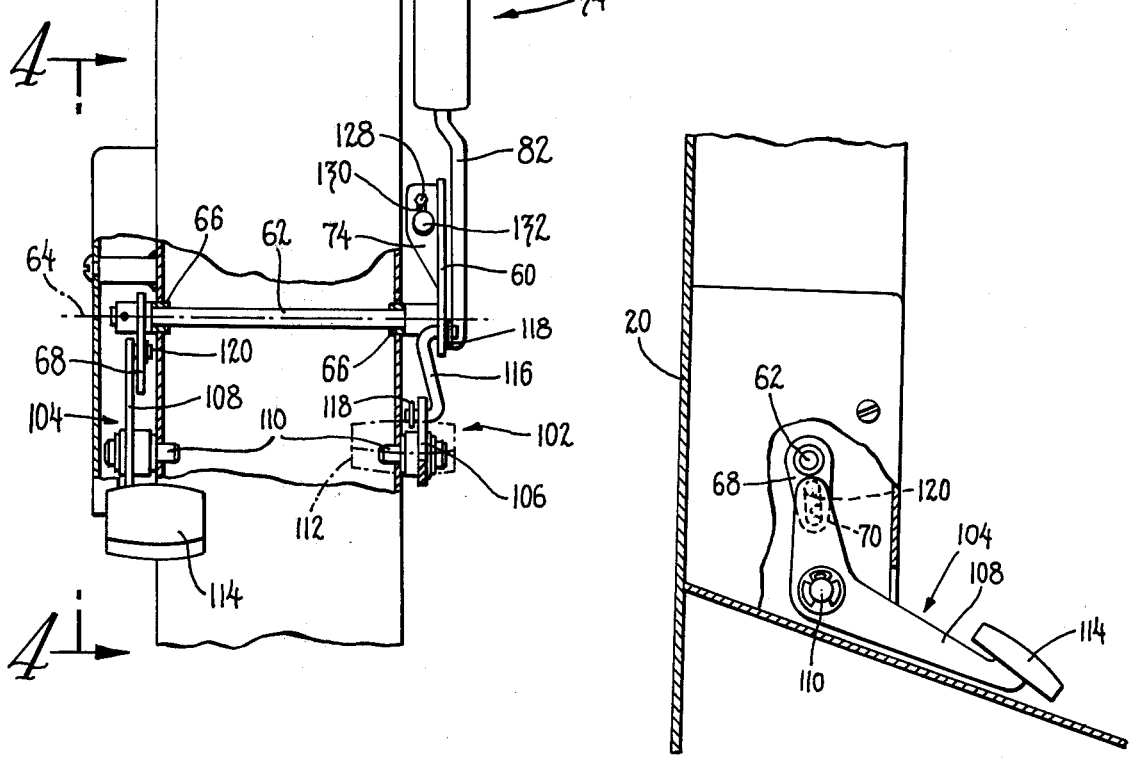
FIG. 4 is a view taken along the lines 4—4 in FIG. 3.

The motion transmitting means 52 includes a bell crank 60 an intermediate portion of which is fixed to one end of a transversely extending shaft 62 rotatable about its axis shown by the broken lines 64 in FIG. 3. The shaft is rotatable in spaced apart bearings 66 carried by the console column of the console assembly 24. A rock arm 68 is fixed to the other end of the shaft 62, the rock arm being provided with an elongated slot 70 (FIG. 4). One arm 72 of the bell crank is connected to the linkage means 54 and the other arm 74 of the bell crank is interconnected with the movable means 58.

The linkage means 54 includes a spring assembly indicated generally at 76. The spring assembly 76 is best shown in FIG. 5 and includes a tubular construction in the form of a metal tube 78, a single spring 80 mounted within the metal tube 78, a rod 82 provided with spaced apart stops 84, 86, and washers 88, 90 disposed between the stops 84 and 86 and opposed ends of the spring 80, the spring engaging the washer and being held in compression thereby. The spring assembly also includes a disc 92 welded to one end of the tube 78 and an upwardly extending link 94 the lower end of which is secured to the disk 92 and the upper end of which is bent at right angles to the lower end and is received within an aperture in the rock arm 50, the upper end being held in place by means of a cotter pin or the like 96. The lower end of the metal tube id deformed as at 98 to bear against the lower washer 90, and an intermediate portion of the metal tube is provided with deformations 100 which bear against the upper washer 88. The lower end of the rod 82 is bent at right angles and passes through an aperture in the outer end of arm 72 of the bell crank, the rod being secured in place in a conventional manner not shown.

The foot control means include first and second pivoted foot pedal constructions indicated generally at 102, 104, respectively. Each foot pedal construction includes an elongated element mounted for pivotal movement between the ends thereof, the elongated element for the first pivoted foot pedal construction 102 being indicated at 106, and the other elongated element being indicated at 108. Each of these elongated elements 106, 108 are supported by stub shafts 110 which extend outwardly from the console assembly 24. First and second foot pedals 112, 114 are mounted on the elongated elements 106, 108, respectively. The first foot pedal construction is interconnected with one arm 72 of the bell crank by a link 116 which extends between an aperture and the forward end of the elongated element 106 in a aperture in one arm 72 of the bell crank. The link 116 is best shown in FIG. 3 and is provided with spaced apart bent end portions which are received within the apertures, the bent end portions being held in place by cotter pins 118 or the like. The end of the elongated element 108 remote from the foot pedal 114 is provided with an outwardly extending pin 120 which is received within the slot 70 of the rock arm 68.

The moveable means 58 includes a push-pull cable having a sheath 122 and a moveable cable 124 disposed within the sheath, the push-pull cable assembly passing through the bulkhead and the sheath being anchored in place by a fitting 126. The end of the cable 124 adjacent to the bell crank is provided with an enlarged portion 128 which is received within the upper narrow portion of a keyhole aperture 130, the keyhole aperture being disposed in a transversely extending flanged portion of the arm 74. The lower end of the keyhole aperture 130 is normally closed by a resilient plug 132 the other end of the cable assembly engages a swingable arm 134 on the engine speed regulator, the arm 134 and the cable 124 normally being biased in a forward direction by means of a spring 136 and thereby maintaining the enlarged portion 128 of the cable in engagement with the arm 74 of the bell crank 60.

In normal operation the hand lever 26 is set for the desired engine operating speed. If it were moved from the idle position shown in full lines in FIG. 2 to the maximum speed shown in broken lines in FIG. 1 this would cause the shaft 28 to rotate and also to cause the outer end of the rock arm 50 to move upwardly. This motion is then transmitted to the bell crank 60 by the link 94, the spring assembly 76, and the rod 82. If the bell crank were to be rotated in a counter clockwise direction as viewed in FIG. 2 the cable 124 would be moved rearwardly against the bias of the spring 136 to increase the engine's speed. It should be noted at this juncture that the spring force of spring 80 is such that it will not compress during movement of the hand lever 26 between its first and second positions. The hand lever is maintained in its desired setting by means of the friction coupling or maintaining means 42. After the hand lever has been set in its desired position the operator of the vehicle may desire to temporarily increase or decrease the engine speed. If he desires to increase the engine speed temporarily it is only necessary for him to depress the pedal 112, and this will cause the bell crank 60 to swing in a counter clockwise direction as viewed in FIG. 2 thereby further increasing the engine speed. The maintaining means 42 maintains the hand lever in its desired position and the spring 80 will be compressed as the rod 82, stop 86, and washer 90 move upwardly within the tubular housing 78. When the foot pedal 112 is released the spring 80 will cause the bell crank to rotate in a clockwise direction thus returning the elongated element 106 to its prior position. The prior position of the first and second foot pedal construction 102, 104 are determined by the setting of the hand lever 26. Thus, when the hand lever is in its full line position shown in FIG. 2 the foot pedal construction 102 will be in a raised position and the foot pedal construction 104 will be in a lowered position. Alternatively, when the hand lever 26 is in its raised dotted line position the foot pedal construction 102 will be in a lowered position (not shown) and the other foot pedal construction will be in a raised position. Intermediate settings of the hand lever will cause the foot pedals to be disposed in corresponding intermediate position. If it is desired to temporarily slow down speed of the engine, and if the left hand foot pedal construction 104 is not already in its fully lowered position, it is then only necessary for the operator of the vehicle to engage the lift hand foot pedal 114. When the left hand foot pedal 114 is moved downwardly the pin 120 in the slot 70 will cause the left hand rock arm 68 on shaft 62 to rotate which will in turn cause the bell crank 60 to rotate in a clockwise direction when viewed in FIG. 2. This will in turn cause the rod 82 to move downwardly, and as the rod 82 moves downwardly the upper stop 84, upper washer 88, and the upper end of the spring 80 will also be moved downwardly causing the spring 80 to become further compressed. Again the spring force is not sufficiently strong to cause the friction coupling 42 to become overridden. Meanwhile, as the bell crank 60 is rotating in the clockwise direction the spring 136 will cause the lever 134 to move in a forward direction thereby maintaining the enlarged portion 128 of the cable 124 in the upper end of the keyhole slot. As the lever 134 is being moved forwardly due to the action of the spring 136 when permitted by forward movement of the bell crank 60 the engine speed will be decreased. When the operator no longer wishes to continue at a slower speed he removes his foot from the foot pedal 112 and the spring 80 will extend and force the washer 88 against the abutment 100 thereby returning the parts to their prior position.

If it is necessary to service portions of the vehicle which require removal of the bulkhead 20 and platform 18 is should be noted that the speed control mechanism can be disconnected from the speed regulator simply be removing the plug 132 from the keyhole slot 130 and by then moving the enlarged portion 128 of the cable 124 downwardly until it can pass through the enlarged portion of the keyhole slot. The operator's platform and forward bulkhead can now be removed without further disassembling of the speed control mechanism. As the fitting 126 engages the sheath 122 of the cable assembly there is no movement between these parts and therefor adequate protection against dust, noise, etc. can easily be maintained.

The control linkage illustrated in this application is so designed as to have minimum backlash.

The invention is not to be limited to the particular details shown and described above, and it is to be understood that other modifications, arrangements and embodiments are deemed to be within the scope of the invention which is to be limited only by the following claims:

We claim:

1. In combination with a vehicle having an engine speed regulator, an operator's station having a lower wall portion or platform, and an upwardly extending wall portion or bulkhead forward of the platform, the improvement comprising a position responsive acceleration and deceleration control means for the engine speed regulator, said control means including:

hand positionable means mounted entirely above the platform and behind said bulkhead, said hand positionable means including a hand lever moveable between first and second positions, and maintaining means for maintaining the hand lever in a given position;

motion transmitting means mounted below the hand positionable means and entirely above the platform and behind the bulkhead;

linkage means mounted entirely above the platform and behind the bulkhead and extending between the hand positionable means and the motion transmitting means and operable to move the motion transmitting means in response to movement of the hand positionable means;

foot control means mounted entirely above the platform and behind the bulkhead and interconnected with said motion transmitting means and operable against spring bias to cause movement of the motion transmitting means without affecting movement of the hand positionable means; and moveable means interconnecting said motion transmitting means and said engine speed regulator, said moveable means including an intermediate portion passing through a wall portion.

2. The control means set forth in claim 1 in which said hand positionable means further includes a transversely extending shaft mounted for rotational movement about its axis behind said bulkhead, and a rock arm fixed to said shaft for movement therewith, the hand lever being fixed to said shaft and importing movement to said shaft and said rock arm when moving between its first and second positions, the upper end of said linkage means being interconnected with said rock arm.

3. The control means set forth in claim 1 in which said motion transmitting means includes a bell crank mounted for swinging movement between the ends thereof, the lower end of the linkage means being interconnected to the outer end of one of the arms of the bell crank, and the moveable means being interconnected with the outer end of the other of the arms of said bell crank.

4. The control means set forth in claim 3 in which the motion transmitting means further includes a generally transversely extending shaft rotatable about its axis, said bell crank being fixed to one end of said shaft, and a rock arm being fixed to the other end of said shaft; and in which said foot control means includes first and second pivoted foot pedal constructions including first and second foot pedals, respectively, means interconnecting the first foot pedal construction with said one arm of said bell crank and operable to rotate the shaft in a first direction upon downward movement of the associated first foot pedal, and means interconnecting the second foot pedal construction with said rock arm and operable to rotate the shaft in an opposed second direction upon downward movement of said second foot pedal.

5. The control means set forth in claim 4 in which each of said first and second foot pedal constructions includes an elongated element mounted for pivotal movement between the ends thereof and a foot pedal on one end, and in which the means interconnecting the first foot pedal construction with said one arm of the bell crank includes a link pivotally secured at opposed ends thereof to said one arm of the bell crank and the other end of said elongated element, and in which the means interconnecting the second foot pedal construction to said rock arm includes a slot within said rock arm, and a pin carried by the other end of said elongated element of the second foot pedal construction, said pin engaging at slot.

6. The control means set forth in claim 1 in which the means for imparting spring bias to the foot control means includes a spring assembly within said linkage means, said spring assembly being capable of being overridden in two directions.

7. The control means as set forth in claim 6 in which said spring assembly includs a single spring, a rod passing through said spring and carrying opposed stops engageable with opposed ends of the spring to maintain the spring under compression, a metal tube, said spring being mounted within the tube, one end of the metal tube being deformed and normally engaging one of said opposed stops, an intermediate portion of said metal tube being deformed inwardly and normally engaging the other of said stops, the end of the rod remote from said metal tube being interconnected with said motion transmitting means, and said metal tube being interconnected with said hand positionable means.

8. The control means set forth in claim 1 in which said hand positionable means further includes a transversely extending shaft, one end of said hand lever being fixed to said shaft, and a rock arm also fixed to said shaft, and in which the linkage means includes a spring assembly capable of being overridden in two directions, said spring assembly including a tubular construction and a rod extending outwardly of said tubular construction, the outer end of said rod being pivotally secured to said motion transmitting means, and the tubular construction being pivotally secured to said rock arm.

9. The control means set forth in claim 8 in which the motion transmitting means includes a second transversely extending shaft, a bell crank fixed to said shaft, the outer end of one of the arms of the bell crank being interconnected with the outer end of said rod, and the outer end of the other arm of the bell crank being interconnected with said moveable means, a rock arm fixed to said second shaft at a location spaced away from said bell crank, and in which the foot control means includes first and second pivoted foot pedal constructions including first and second foot pedals, respectively, and means interconnecting said first and second foot pedal constructions with said bell crank and said rock arm, respectively in such a manner that when the first foot pedal is moved downwardly it will impart rotational movement to said shaft in a first direction, and when the second foot pedal is moved downwardly it will impart rotation movement to said shaft in an opposed second direction.

* * * * *